Patented May 3, 1927.

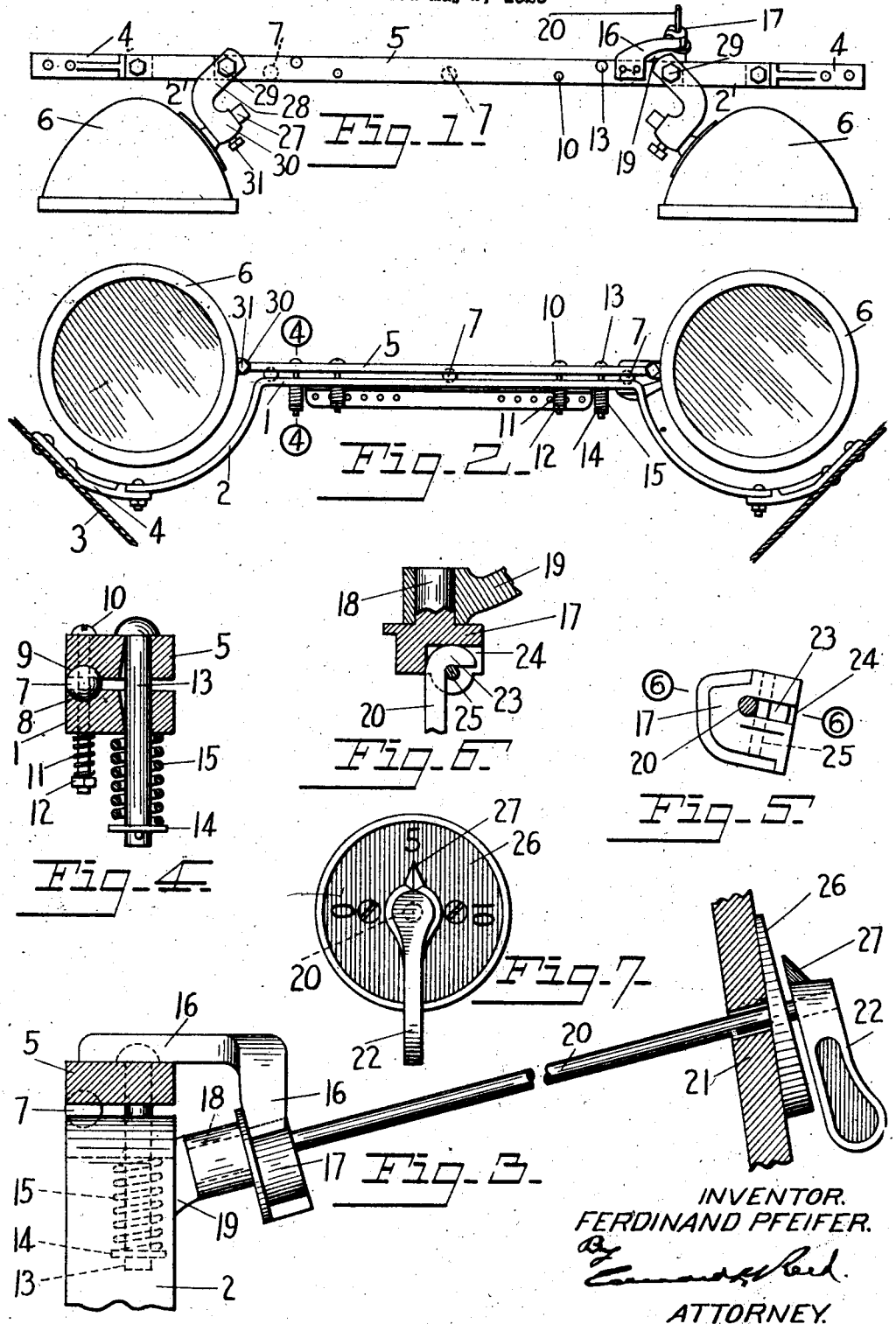

1,627,199

UNITED STATES PATENT OFFICE.

FERDINAND PFEIFER, OF SPRINGFIELD, OHIO, ASSIGNOR TO THE TAYLOR TILTING LIGHT COMPANY, OF MARYSVILLE, OHIO, A CORPORATION OF OHIO.

TILTING HEADLIGHT FOR AUTOMOBILES AND THE LIKE.

Application filed May 2, 1925. Serial No. 27,394.

This invention relates to tilting headlights for automobiles and the like and is in the nature of an improvement on the device shown in the patent to Andrew C. Taylor and Ferdinand Pfeifer, No. 1,543,885.

One object of the invention is to provide in a tilting headlight of the type shown in said application improved means for tilting, and controlling the position of, the headlights.

A further object of the invention is to provide an improved connection between the lamp supporting member and the transverse frame which will retain these members in their proper operative relation without interfering with the pivotal movement of the lamp supporting member.

Other objects of the invention will appear as the device is described in detail.

In the accompanying drawings Fig. 1 is a plan view of a device embodying my invention; Fig. 2 is a front elevation of the same; Fig. 3 is a side elevation of the actuating device for tilting the lamp supporting frame, showing that frame in section; Fig. 4 is a section taken on the line 4—4 of Fig. 2; Fig. 5 is a detail of the actuating cam; Fig. 6 is a section taken on the line 6—6 of Fig. 5; and Fig. 7 is a detail view of the hand lever and dial.

In these drawings I have illustrated one embodiment of my invention and have shown the same as applied to a tilting lamp mechanism of the type shown in the above mentioned application but it will be understood that the invention may take various forms and may be applied to lamp supporting devices of various kinds.

The mechanism here shown comprises a transverse frame member 1 having a substantially horizontal intermediate portion and having its end portions curved downwardly and outwardly, as shown at 2, and adapted to be secured to the automobile near the respective sides thereof. In the present instance, the ends of the parts 2 of the frame are rigidly but detachably secured to the fenders 3 by means of brackets 4. Supported on the horizontal intermediate portion of the frame is a lamp supporting member 5 which, in the present instance, comprises a flat straight bar of a length slightly greater than the length of the intermediate portion of the frame 1. Mounted upon the respective ends of this lamp supporting member or bar 5 are the headlights 6. The lamp supporting member 5 is pivotally mounted on the frame 1 so that it may move about a longitudinal axis to cause the headlights to be tilted. The pivotal connection is preferably arranged close to the front edges of the lamp supporting member and the frame so that there will be no parts projecting in front of the axis to interfere with the pivotal movement of the lamp supporting member. The pivotal connection as here shown is effected by means of pivot members or bolts 7 each of which is seated in opposed recesses 8 and 9 formed, respectively, in intermediate portion of the frame 1 and in the lamp supporting member 5. There may be any suitable number of these pivot members but I have here shown one near each end of the intermediate portion of the frame and a third or intermediate pivot member arranged near the center of the intermediate portion of the frame so as to support the intermediate portion of the lamp supporting member against vibration or rattling. The balls are preferably loosely mounted in their recesses and the lamp supporting member is retained in position thereon and the balls retained in their recesses by means of yieldable connecting members, here shown in the form of bolts 10 extending loosely through the lamp supporting member 5 and through the frame 1 and having coiled springs 11 interposed between the nuts 12 on the lower ends thereof and the lower surface of the frame member 1. The connecting devices or bolts 10 are arranged substantially in line with the axis about which the lamp supporting member moves and it will be apparent that they will hold the lamp supporting member firmly in engagement with the balls and prevent the displacement of the balls, without interfering with the movement of the lamp supporting member about its points of contact with the balls. The lamp supporting member is held in its normal position, which, in the present instance, is a substantially horizontal position, by means of bolts or rods 13 extending loosely through the lamp supporting member and frame near the rear edges thereof and provided at their lower ends with stops, such as washers 14, between which and the lower surface of the frame are interposed springs 15. These springs are of sufficient strength to hold the lamp supporting member in its normal or retracted position and to prevent any material vibration thereof but will yield to permit the lamp supporting member to tilt when force is applied thereto.

I prefer that the rear edge of the lamp supporting member should be supported out of contact with the frame so as to prevent any rattling which might result if these parts were in contact and I have here shown the lamp supporting member as having rigidly secured thereto a rearwardly and laterally extending arm 16 which engages a normally fixed part 17 on the frame 1 at a point considerably removed from the rear edge of the frame so as to provide a relatively long leverage for the arm 16 which will prevent the same from vibrating and rattling at its point of contact with the normally fixed part. The means for tilting the lamp supporting member against the action of the springs 15 may take various forms but, in the present arrangement, I utilize the arm 16 and the normally fixed part or stop 17 on the frame 1 to control the position of the lamp supporting member and lamps. To this end the normally fixed part or stop 17 is shown in the form of a cam having a stud or trunnion 18 rotatably mounted in a bearing bracket 19 rigidly secured to and projecting rearwardly from the frame 1. The cam surface of the part 17 may be of any suitable shape which will cause it to engage the arm 16 when the member 17 is rotated and move the lamp supporting member about its axis. Preferably, however, the cam surface is divided into a plurality of substantially flat surfaces separated by inclined portions so that the contact between these flat surfaces and the arm 16 of the lamp supporting member will retain the cam in its adjusted position and prevent the same from shifting or altering its position due to the vibration of the machine. In the present instance, the actuating member or cam 17 has three flat peripheral surfaces, one of which will support the lamp supporting member in its normal position and the other two of which will, respectively, support the same at different degrees of inclination. Any suitable means may be connected with the member or cam, whereby it may be positively rotated and I prefer to utilize an actuating rod 20 which is rotatably mounted in the instrument board 21 of the automobile and is provided at its rear end with an actuating handle 22. The extreme forward end of this rod is bent at an angle to the length of the rod to provide a transverse portion 23 which is seated in a slot or recess 24 in the rear face of the member 17 and is retained in this slot by means of a pin 25. Thus it will be apparent that the rotation of the rod by the actuating lever 22 will cause the cam or actuating member 17 to be rotated. If desired, a dial 26 may be mounted on the instrument board, about the bearing for the rod 20, and the lever 22 provided with a pointer 27 which will indicate on the dial the position of the lamp supporting member.

The lamps 6 may be mounted on the lamp supporting member or bar 5 in any suitable manner but, in the present device, I have shown a connecting device designed particularly for utilizing standard lamps of the type commonly employed on a Ford automobile, thus enabling these lamps to be used with the tilting support. Such a lamp is provided with a relatively long stem or supporting rod 27 by means of which it is mounted in the usual lamp bracket and when the lamp is to be mounted on the tiltable supporting device I cut off the major portion of this stem or rod so as to provide a relatively short stud, as shown in Fig. 1. A connecting bracket 28 is pivotally mounted on each end of the lamp supporting bar 5 on a vertical axis, the connection preferably being by means of a bolt 29 which will enable the bracket to be clamped rigidly in adjusted positions. The outer end of the bracket extends at an angle to the body portion of the bracket and is provided with a bearing to receive the stud 27 of the lamp, the stud being held in adjusted positions in the bar by means of a set screw 31, or other suitable retaining device.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. In a device of the character described, a transverse frame member adapted to be mounted on an automobile, an elongated lamp supporting member extending lengthwise of said frame member and pivotally mounted thereon for movement about a longitudinal axis, actuating means for said lamp supporting member comprising a part rigidly connected to said lamp supporting member and a device rotatable about an axis extending transversely to the axis of said lamp supporting member and arranged to act on said part.

2. In a device of the character described, a transverse frame member adapted to be mounted on an automobile, a lamp supporting member extending lengthwise of and pivotally mounted on said frame member, an actuating device for said lamp supporting member mounted on an axis extending transversely to the axis of said lamp supporting member, a rod connected with said actuating device, a handle for rotating said rod, a dial mounted adjacent to said rod, and a pointer connected with said handle and arranged to move over said dial.

3. In a device of the character described, a frame adapted to be mounted on an automobile in a position transverse thereto, an elongated lamp supporting member extending lengthwise of said frame member and mounted thereon for movement about a longitudinal axis, an arm rigidly secured to said lamp supporting member, and a cam mounted on said frame member and acting on said arm to move said lamp supporting member about its axis.

4. In a device of the character described, a frame adapted to be mounted on an automobile in a position transverse thereto, an elongated lamp supporting member extending lengthwise of said frame member and mounted thereon for movement about a longitudinal axis, a spring to retain said lamp supporting member in its normal position, an arm rigidly secured to said lamp supporting member, and a cam mounted on said frame and acting on said arm to move said lamp supporting member against the action of said spring.

5. In a device of the character described, a frame member adapted to be mounted on an automobile, in a position transverse thereto, a lamp supporting bar extending lengthwise of said frame member and pivotally mounted near its forward edge on said frame member, a yieldable device connected with said frame member and acting on said bar to hold the same normally in its retracted position, an arm rigidly secured to said bar, a cam rotatably mounted on said frame member and arranged to engage said arm, and means for rotating said cam.

6. In a device of the character described, a frame member adapted to be mounted on an automobile in a position transverse thereto, a lamp supporting member extending lengthwise of said frame member and pivotally mounted near its forward edge thereon, a rearwardly extending arm rigidly secured to said lamp supporting member, a bearing bracket carried by said frame member, a cam having a part rotatably mounted on said bearing member, said cam being arranged to operatively engage said arm, a spring controlled device for holding said arm in contact with said cam, an actuating rod connected with said cam, and a handle on said rod.

7. In a device of the character described, a frame member adapted to be mounted on an automobile in a position transverse thereto, a lamp supporting member extending lengthwise of said frame member, pivot members interposed between said frame member and said lamp supporting member, yieldable means acting on said lamp supporting member to hold the same in engagement with said pivot members, other yieldable means to resist the movement of said lamp supporting member in one direction about its axis, and means for moving said lamp supporting member against the action of said last mentioned yieldable means.

8. In a device of the character described, a frame member adapted to be mounted on an automobile in a position transverse thereto, a lamp supporting member extending lengthwise of said frame member, pivot members loosely mounted between said frame member and said lamp supporting member, yieldable means acting on said lamp supporting member to connect the same with said frame member and to retain said pivot members in position between said lamp supporting member and said frame member without interfering with the movement of said lamp supporting member about said pivot members, and means for actuating said lamp supporting member.

9. In a device of the character described, a frame member adapted to be mounted on an automobile in a position transverse thereto, a lamp supporting member extending lengthwise of said frame member, said frame member and said lamp supporting member being provided with opposed recesses, pivot members loosely mounted in said recesses, yieldable connecting devices extending through said frame member and said lamp supporting member in line with said pivot members, and means for actuating said lamp supporting member to move the same about said pivot members.

10. In a device of the character described, a frame member adapted to be mounted on an automobile in a position transverse thereto, a lamp supporting member extending lengthwise of said frame member, said members having a plurality of pairs of opposed recesses, the pairs of recesses being spaced apart, pivot members loosely mounted in the respective pairs of recesses, bolts extending loosely through said frame member and said lamp supporting member in line with said pivot members, a stop secured to one end of each bolt, springs confined between said stops and said frame member, and an actuating device for moving said lamp supporting member about said pivot member.

11. In a device of the character described, a frame member adapted to be mounted on an automobile in a position transverse thereto and having a flat intermediate portion, a flat lamp supporting member arranged above and extending lengthwise of said frame member, said frame member and said lamp supporting member having a pair of opposed recesses near each end thereof and near the center thereof, said recesses being arranged near the forward edges of said members, pivot members loosely mounted in the respective pairs of recesses, bolts extending loosely through said frame member and said lamp supporting member in line with said recesses, stops carried by said bolts near the lower ends thereof, springs confined between said stops and said frame member, yieldable means acting on the rear portions of said frame member and said lamp supporting member to hold the latter normally against movement about said pivot members, and an actuating device for said lamp supporting member to move the same against the action of said last mentioned means.

12. In a device of the character described, a frame member adapted to be mounted on an automobile in a position transverse thereto and having a flat intermediate portion, a flat lamp supporting member arranged above and extending lengthwise of said frame member, said frame member and said lamp supporting member having a pair of opposed recesses near each end thereof and near the center thereof, said recesses being arranged near the forward edges of said members, pivot members loosely mounted in the respective pairs of recesses, bolts extending loosely through said frame member and said lamp supporting member in line with said recesses, stops carried by said bolts near the lower ends thereof, springs confined between said stops and said frame member, yieldable means acting on the rear portions of said frame member and said lamp supporting member to hold the latter normally against movement about said pivot members, an arm rigidly secured to said lamp supporting member, a cam arranged to act on said arm to impart movement to said lamp supporting member, and means for rotating said cam.

13. In a device of the character described, a frame member adapted to be mounted on an automobile in a position transverse thereto, a lamp supporting member extending lengthwise of said frame member and pivotally connected thereto, yieldable means for holding said lamp supporting member normally against movement about its axis, an arm rigidly secured to said lamp supporting member, a disk-shaped cam rotatably mounted on said frame member and having a series of flat peripheral surfaces to successively engage said arm, said cam disk having a transverse slot in its rear face, a rod having a transverse portion seated in said slot, and means for rotating said rod.

In testimony whereof, I affix my signature hereto.

FERDINAND PFEIFER.